United States Patent [19]
Stearns

[11] Patent Number: 6,113,171
[45] Date of Patent: Sep. 5, 2000

[54] TAILGATE EXTENDER

[76] Inventor: William A. Stearns, 8828 Larchwood Dr., Dallas, Tex. 75238

[21] Appl. No.: 09/183,678

[22] Filed: Oct. 30, 1998

[51] Int. Cl.$^7$ ....................................................... B62C 1/06
[52] U.S. Cl. ........................ 296/26.08; 296/97.1; 296/44
[58] Field of Search .............................. 296/26.08, 57.1; 108/44

[56] References Cited

U.S. PATENT DOCUMENTS

| | | | |
|---|---|---|---|
| 4,023,850 | 5/1977 | Tillery | 296/26 |
| 4,095,704 | 6/1978 | Ratliff | 296/57.1 |
| 4,375,306 | 3/1983 | Linder | 108/44 |
| 4,932,703 | 6/1990 | Chamberlin et al. | 296/26 |
| 5,033,662 | 7/1991 | Godin | 224/42.43 |
| 5,090,335 | 2/1992 | Russell | 108/44 |
| 5,116,096 | 5/1992 | Taylor | 296/3 |
| 5,181,822 | 1/1993 | Allsop et al. | 414/462 |
| 5,267,748 | 12/1993 | Curran | 280/415.1 |
| 5,277,275 | 1/1994 | Ablabutyna | 296/57.1 |
| 5,368,209 | 11/1994 | Hill | 224/42.44 |
| 5,451,088 | 9/1995 | Broad | 296/26.08 |
| 5,458,389 | 10/1995 | Young | 296/26.08 |
| 5,533,771 | 7/1996 | Taylor et al. | 296/57.1 |
| 5,649,731 | 7/1997 | Tognetti | 296/57.1 |
| 5,649,734 | 7/1997 | Speis | 108/44 |
| 5,658,033 | 8/1997 | Delaune | 296/26 |
| 5,678,743 | 10/1997 | Johnson et al. | 296/26.08 |
| 5,765,892 | 6/1998 | Covington | 296/57.1 |
| 5,775,759 | 7/1998 | Cummins | 296/57.1 |
| 5,820,188 | 10/1998 | Nash | 296/57.1 |
| 5,857,741 | 1/1999 | Anderson | 108/44 |
| 5,927,925 | 7/1999 | Winkelmann | 296/26.08 |
| 5,938,092 | 8/1999 | Johnson | 296/26.08 |
| 5,950,617 | 9/1999 | Lorenz | 108/44 |

*Primary Examiner*—Joseph D. Pape
*Assistant Examiner*—Kiran Patel
*Attorney, Agent, or Firm*—Mark W. Handley

[57] ABSTRACT

A tailgate extender is provided for extending the length of a cargo surface of a bed of a truck having a receiver hitch or the like. A support platform is provided by a single weldment of a flat aluminum plate, a receiver tube, a support bar and sidewalls. The receiver tube is mounted to a lower surface of the aluminum plate. The support bar is formed from a flat strip of aluminum having a forward facing planar surface which abuts a rearward end of the receiver tube, and an upwardly facing edge which abuts and is welded to the lower side of the aluminum plate. An elongated mounting post has a forward section which releasably fits within the receiver hitch, and a rearward section which releasably fits within the receiver tube. Holes extend through respective ones of the forward and rearward sections of the mounting post for aligning with respective holes in the receiver hitch and holes in the receiver tube for receiving latch pins to secure the support platform to the truck. The support platform and the elongated mounting posts have profiles such that the lower surface of the aluminum plate of the support platform will fit flush against and overlap the end of a cargo surface of the truck. Two tailgate sidewall sections are pivotally mounted to forward ends of two of the sidewalls of the support platform.

20 Claims, 3 Drawing Sheets

TAILGATE EXTENDER

CROSS REFERENCE TO RELATED APPLICATION

The present application is related to U.S. Patent Application Ser. No. 29/095,829, filed Oct. 30, 1998 entitled "TAILGATE EXTENDER," invented by William A. Stearns, having (Attorney Docket No. WSTE-24,414) and being filed of even date herewith.

TECHNICAL FIELD OF THE INVENTION

The present invention relates in general to hauling accessories for trucks, and in particular to a receiver hitch mounted accessory for extending the lengths of cargo beds of trucks.

BACKGROUND OF THE INVENTION

Trucks have been used for hauling various items of cargo, such as equipment, supplies, lumber, refuse and the like. Trucks typically have cargo beds which are fixed in length and manufactured to standard sizes. For example, pick-up trucks typically have cargo bed lengths of either six feet or eight feet, and widths of approximately four feet at the narrowest portions. Some trucks have tailgates which may be lowered to extend the lengths of cargo beds, which typically adds approximately two feet of length. However, the cargo hauled in such trucks is often of sizes which are longer than either the lengths of the cargo beds or the combined lengths of the cargo beds and the associated tailgates. One example would be pieces of lumber which are often in lengths of twelve feet. In such cases, transport of items of such sizes will require that the ends extend from the rear of the truck.

SUMMARY OF THE INVENTION

A tailgate extender is provided for extending the length of a cargo surface of a bed of a truck having a receiver hitch or the like. The cargo surface being the upwardly facing surface of the truck bed. A support platform is provided by a single weldment of a flat aluminum plate, a receiver tube, a support bar and sidewalls. The receiver tube is mounted to a lower surface of the aluminum plate. The support bar is formed from a flat strip of aluminum having a forward facing planar surface which abuts a rearward end of the receiver tube, and an upwardly facing edge which abuts and is welded to the lower side of the aluminum plate. An elongated mounting post has a forward section which releasable fits within the receiver hitch, and a rearward section which releasably fits within the receiver tube. Holes extend through respective ones of the forward and rearward sections of the mounting post for aligning with respective holes in the receiver hitch and holes in the receiver tube for receiving latch pins to secure the support platform to the truck. The support platform and the elongated mounting posts have profiles such that the lower surface of the aluminum plate of the support platform will fit flush against and overlap the end of a cargo surface of the truck. Two tailgate sidewall sections are pivotally mounted to forward ends of two of the sidewalls of the support platform.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
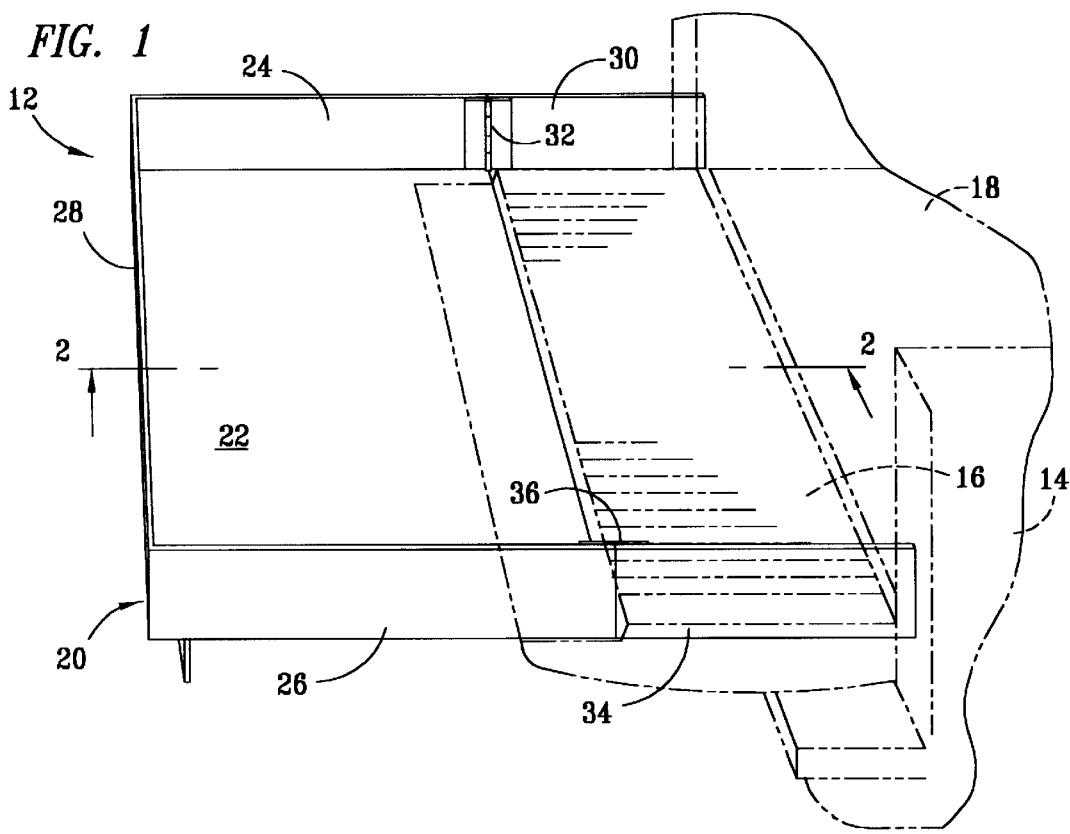
FIG. 1 is a right side, perspective view of a tailgate extender mounted to a rear of a truck.

FIG. 1 is perspective view of the right side of a tailgate extender 12 mounted to a truck 14. The tailgate extender 12 is mounted adjacent to a tailgate 16 to extend the cargo surface of a bed 18 of the truck 14. The tailgate extender 12 includes a support platform 20 which provides a shelf that overlaps the tailgate 16 to provide an extended cargo surface that extends continuously, without any gaps between the support platform 20 and the bed 18 of the truck 14. The support platform 20 includes a flat plate 22, a left sidewall 24, a right sidewall 26 and a rear sidewall 28. A left tailgate sidewall extension 30 is pivotally mounted to the forward end of the left sidewall 24 by a hinge 32. A right sidewall extension 34 is pivotally mounted to the forward end of the right sidewall 26 by a hinge 36. The tailgate sidewall extensions 30 and 34 extend forward of the flat plate 22, perpendicular to the flat plate 22.

Figure 2:
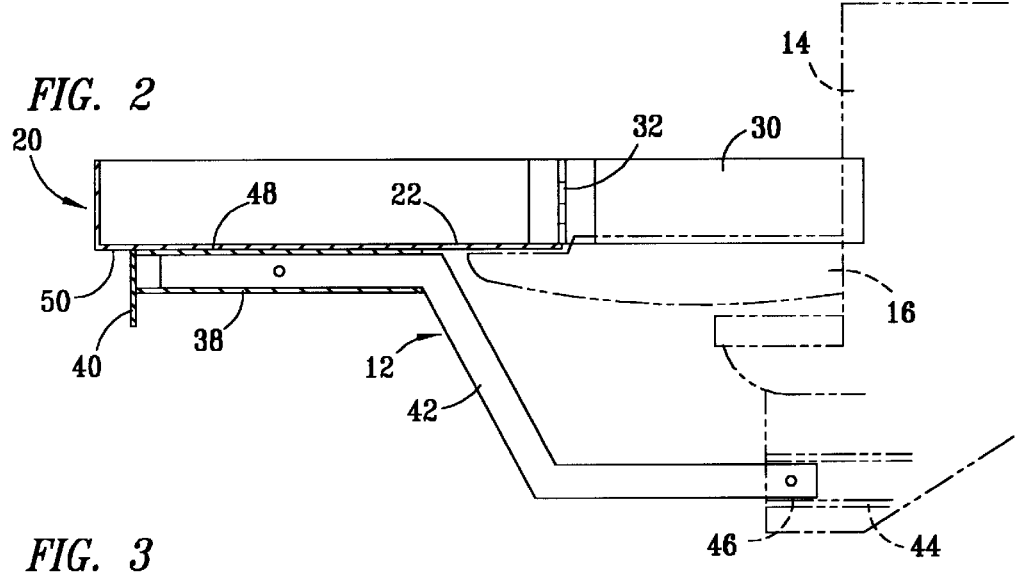
FIG. 2 is a sectional view of the tailgate extender, taken along section line 2—2 of FIG. 1.

FIG. 2 is a side elevational, section view of the tailgate extender 12, taken along section line 2—2 of FIG. 1. A receiver tube 38 is mounted to the bottom of the plate 22. A support bar 40 is a strip of aluminum sheet which provides a crossbar that extends across a rearward portion of the plate 22, and fits flush against, or abuts, a rearward terminal end of the receiver tube 38. The receiver tube 38 is preferably provided by a length of square aluminum tubing which is configured for receiving an elongated mounting post 42. The mounting post 42 is preferably formed of square tubing which is sized for removably fitting within a receiver hitch 44 of the truck 14. The receiver hitch 44 has a receiver tube 46, which provides a truck mounting adapter. The plate 22 has an upper planar surface 48 and a lower planar surface 50. The receiver tube 38 is mounted directly to the lower planar surface 50.

Figure 3:
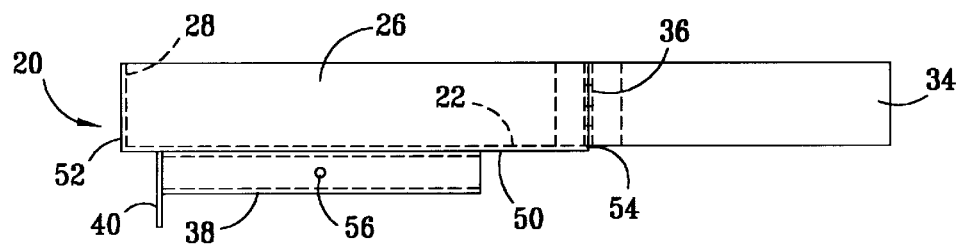
FIG. 3 is a right side view of the tail gate extender.

FIG. 3 is side elevation view of the platform 20. The support platform 20 is preferably a single weldment, which comprises flat plate 22, the left sidewall 24 (shown in FIG. 1), the rear sidewall 28, the right sidewall 26, the support bar 40 and the receiver tube 38. The forward tailgate sidewall extension 30 (shown in FIG. 1) and the right forward tailgate sidewall extension 34 are mounted by hinges 32 (shown in FIG. 1) and 36 to the forward end of the sidewalls 24 and 26 of the support platform. weldment 20. The receiver tube 38 is preferably mounted to extend parallel to forward and rearward directions, intermediately disposed between a rearward end 52 and a forward end 54 of the plate 22. The support bar 40 preferably abuts and fits flush against the rearward terminal end of the receiver tube 38. A pair of holes 56 extend through an intermediate portion of the receiver tube 38.

Figure 4:
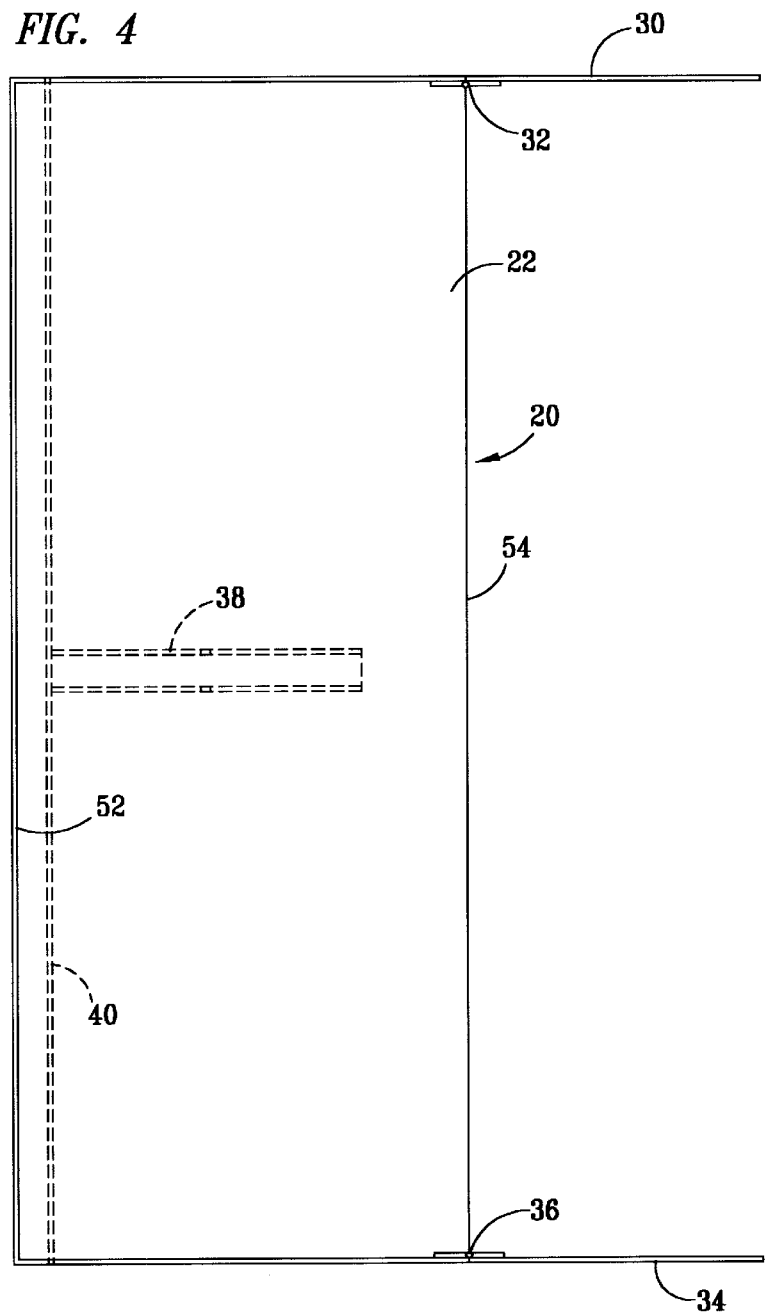
FIG. 4 is a top view of the tailgate extender.

FIG. 4 is a top view of the support platform 20. The plate 22 is preferably provided by a flat sheet of aluminum diamond plate which is rectangular in shape, with the rearward end 52 and the forward end 54 being parallel and defining the edges of the planar surface 48. The diamond pattern of the aluminum diamond plate 22 may be disposed to face inward to prevent slippage of the cargo, the diamond pattern may face outward for decoration, or a combination of the two may be used. The support bar 40 is shown extending across the full width of the plate 22. The receiver tube 38 is shown fitting flush against the forward surface of the support bar 40.

Figure 5:
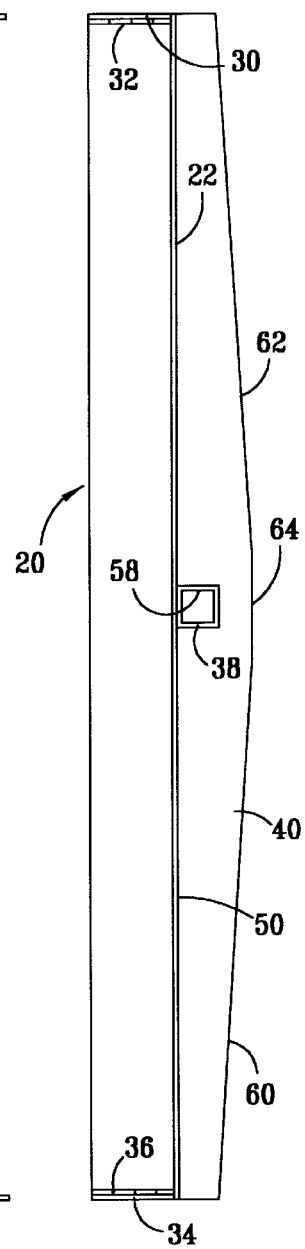
FIG. 5 is front view of the tailgate extender.

FIG. 5 is a front view of the support platform 20. The support bar 40 is shown fitting flush against the bottom 50 of the flat plate 22. Preferably, the support bar 40 is made from a flat strip of aluminum sheet which is cut to have a horizontally extending upper end, a right side bottom edge 60 and a left side bottom edge 62, which meet in central horizontally extending edge section 64. The right side bottom edge 60 and the left side bottom edge 62 are disposed at an acute angle to the horizontal. The forward terminal end of the receiver tube 38 has an opening 58 for receiving the mounting post 42 (shown in FIG. 2).

Figure 6:
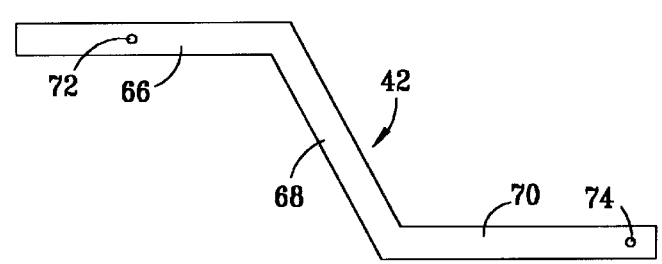
FIG. 6 is a side elevational view of a mounting post of the tailgate extender.

FIG. 6 is a side elevation view of the elongated mounting post 42. The mounting post 42 is preferably made of square tubing, sized for fitting within the opening 58 of the receiver tube 38 (shown in FIG. 4) and the receiver tube 46 of the hitch 44 The mounting post 42 has a rearward section 66 which extends with a length which is substantially parallel to the horizontal. A central section 68 extends at an acute angle to the horizontal. A forward section 70 extends substantially parallel to the horizontal. A hole 72 is formed into the rearward section 66 and a hole 74 is formed into the forward section 64 for aligning the holes 56 of the receiver tube 38 (shown in FIG. 3) and for aligning with the holes in the receiver tube 46 of the receiver hitch 44 (shown in FIG. 2), respectively.

Figure 7:
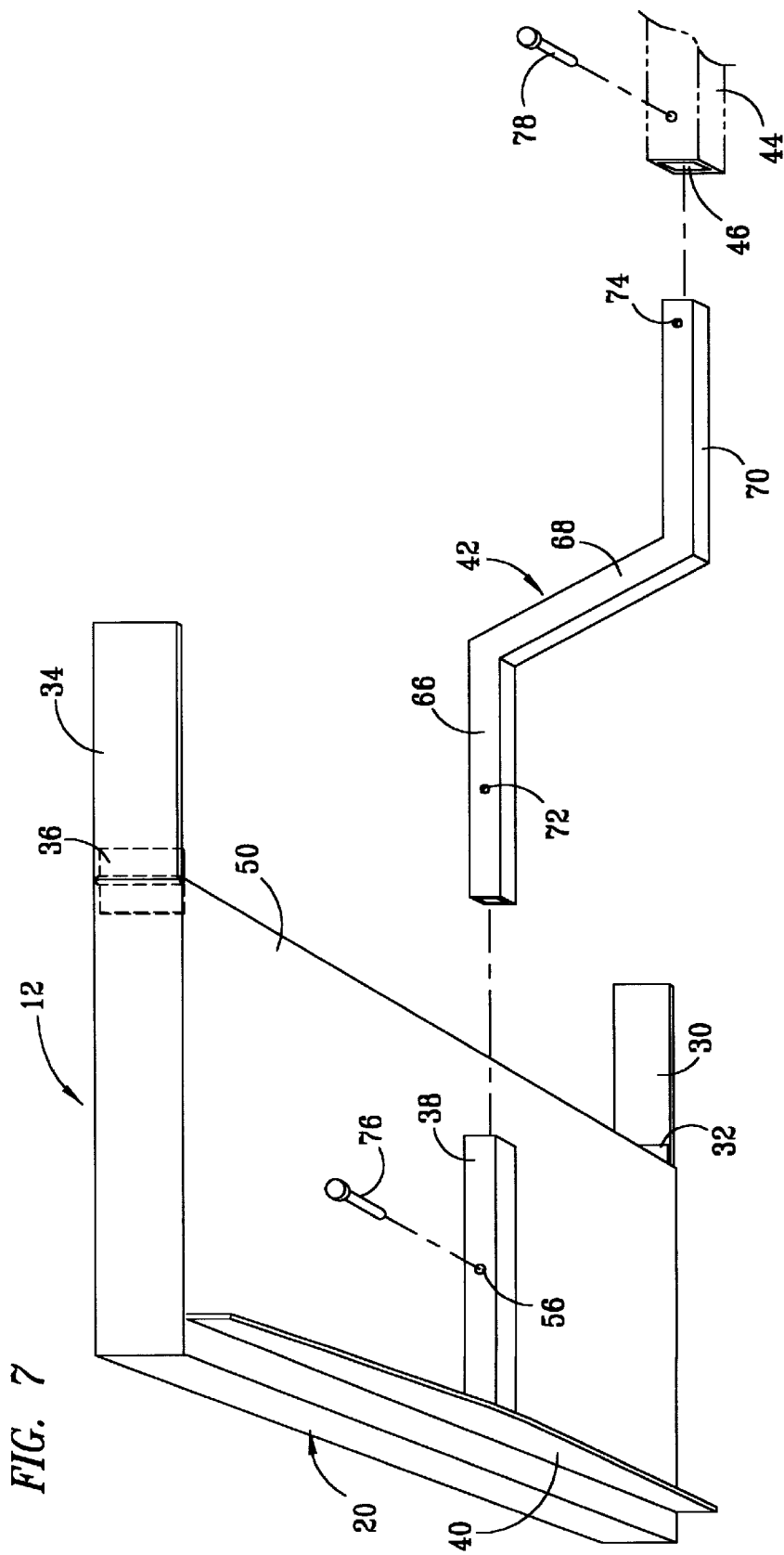
FIG. 7 is an exploded, perspective view of the tailgate extender as viewed from beneath the tailgate extender.

FIG. 7 is an exploded, perspective view of the tailgate extender 12, as viewed from beneath the tailgate extender 12. The tailgate sidewall extensions 30 and 34, which are mounted to the support platform weldment 20 by hinges 32 and 36, respectively. The rearward terminal end of the receiver tube 38 is disposed flush against the support bar 40. The elongated mounting post 42 is shown having the rearward end 66 disposed for inserting into the receiver tube 38 until the hole 72 aligns with the holes 56 for receiving the latch pin 76. The forward end 70 of the mounting post 42 is shown as being disposed for inserting into mounting adapter 46 of the receiver hitch 44 until the hole 74 aligns with a hole in the mounting adapter 46 for receiving a latch pin 78. The profiles of the support platform 20 and the mounting post 42 are such that the bottom surface of the platform weldment 20 will fit flush against and slightly overlap the cargo surface defined by the tailgate 16, and the tailgate sidewall extensions 30 and 34 will slightly overlap the sidewalls of the bed 18, as shown in FIGS. 1 and 2.

Preferably, the entire support platform 20 is formed as a single weldment of aluminum, which provides a lightweight cargo adapter that may be readily installed and removed from a truck by a single person. The mounting post 42 is preferably formed of steel tubing. The receiver tube 38 may also be formed of steel tubing and secured to the support platform by mechanical fasteners, but preferably is formed of aluminum and welded to the support platform.

The above-described tailgate extender provides several advantages over the prior art. The tailgate extender has a support platform which provides a shelf that is a singular weldment formed of aluminum, such that it is light-weight and may be easily handled by a single person. The forward end of the support platform extends slightly over and directly against a rearward portion of a truck cargo surface, such that there are no gaps between the truck cargo support surface and the support platform. Sidewalls are provided for retaining cargo on the platform and within the bed of the truck. Tailgate sidewall extensions are pivotally mounted to forward ends of the sidewalls of the support platform by hinges, and are continuous with the sidewalls of the support platform and fit directly against the sidewalls of the truck cargo bed. The tailgate sidewall extensions may be folded above the support platform and the mounting post is removable from the receiver tube of the support platform, such that the tailgate extender may be more easily handled and transported, and more compactly stored.

Although the preferred embodiment has been described in detail, it should be understood that various changes, substitutions and alterations can be made therein without departing from the spirit and scope of the invention as defined by the appended claims.

What is claimed is:

1. An apparatus for extending a cargo surface of a bed of a truck having a truck mounting adapter, comprising:

a platform having an upper surface, a lower surface, a rearward end, a forward end and two sides;

a platform mounting adapter mounted to said lower surface of said platform and facing in a forward direction between said forward and rearward ends of said platform;

a support bar extending across said lower surface of said platform, between said two sides of said platform;

a mounting post having a forward end which releasably engages with the truck mounting adapter to secure said mounting post to the truck, and a rearward end which releasably engages with said platform mounting adapter to secure said mounting post to said platform;

wherein said platform and said mounting post have respective lengths and profiles such that when said forward end of said mounting post is secured to the truck mounting adapter and said rearward end of said mounting post is secured to said platform mounting adapter, said lower surface of said platform will fits against and overlaps the cargo surface of the truck.

2. The apparatus of claim 1, wherein said platform mounting adapter comprises a receiver tube which extends parallel to forward and rearward directions relative to said platform and the truck.

3. The apparatus of claim 1, wherein said support bar comprises a strip of aluminum which is mounted to said lower surface of said platform to extend from one of said sides to an other of said sides of said platform.

4. The apparatus of claim 3, wherein a forward side of said strip of aluminum of said support bar abuts a rearward end of said platform mounting adapter.

5. The apparatus of claim 4, wherein said strip of aluminum has two flat surfaces and two ends, said two ends being defined at terminal edges of said two flat surfaces, and one of said two ends of said support bar is mounted flush against said lower surface of said platform, such that said two flat surfaces extend transverse to a length of said platform mounting adapter and transverse to said lower surface of said platform.

6. The apparatus of claim 1, further comprising three sidewalls which are mounted to extend upwards from said platform, orthogonal to a flat upper surface of said platform.

7. The apparatus of claim 6, further comprising two tailgate sidewall extensions which are mounted to forward ends of respective ones of two of said three sidewalls, and extend forward of said platform and adjacent to lateral sides of said tailgate.

8. The apparatus of claim 7, wherein said two tailgate sidewall extension comprise respective ones of two flat plates, pivotally mounted to said forward ends of said two sidewalls and extending transverse to a planar upper surface of said platform.

9. The apparatus of claim 1, further comprising:
said platform mounting adapter having a receiver tube which extends parallel to forward and rearward directions relative to said platform and the truck;
said support bar being defined by a strip of aluminum which is mounted to extend from one of said sides to an other of said sides of said platform, and said strip of aluminum being disposed adjacent to and abutting a rearward end of said platform mounting adapter;
said strip of aluminum which defines said support bar having a length, two flat surfaces and two ends, said two ends being defined at said terminal edges of said two flat surfaces, and one of said two ends of said strip of aluminum being mounted flush against said lower surface of said platform, such that said two flat surfaces extend transverse to a length of said platform mounting adapter and transverse to said lower surface of said platform; and
three sidewalls which are mounted to extend upwards from said platform, orthogonal to a flat upper surface of said platform; and
two tailgate sidewall extensions defined by two flat plates which are pivotally mounted to respective ones of said forward ends of said two sidewalls, said two flat plates extending transverse to a planar upper surface of said platform.

10. An apparatus for extending a cargo surface of a bed of a truck having a rearwardly facing, truck mounting adapter, comprising in combination:
a flat aluminum plate having a planar upper surface, a planar lower surface, a rearward end, a forward end and two side edges;
a receiver tube mounted to said lower surface of said plate along a length of said receiver tube, said length extending between said forward and rearward ends of said plate, and said receiver tube having a pair of holes which are spaced apart on opposite sides of said receiver tube and aligned transverse to said length for receiving a latch pin;
an aluminum crossbar mounted to extend across said lower side of said plate, between said two side edges;
an elongated mounting post having a forward end which releasably fits within the truck mounting adapter, and a rearward end which releasably fits within said receiver tube, said mounting post having forward and rearward holes which extend transversely through said receiver tube, said forward hole being disposed for aligning with the truck mounting adapter for receiving a second latch pin and said rearward hole being disposed for aligning with said holes of said receiver tube for receiving said latch pin to secure said receiver post within said receiver tube; and
wherein said plate and said elongated post have respective lengths and profiles such that when said forward end of said elongated post is secured within the truck mounting adapter and said rearward end of said elongated post is secured within said receiver tube, said lower side of said plate will fits directly against and overlaps the cargo surface of the truck.

11. The apparatus of claim 10, wherein said length of said receiver tube extends substantially parallel to forward and rearward directions.

12. The apparatus of claim 10, wherein said aluminum crossbar comprises a strip of aluminum plate which is mounted to extend from said one of said side edges to an other of said side edges of said plate.

13. The apparatus of claim 12, wherein said aluminum crossbar abuts said rearward end of said receiver tube.

14. The apparatus of claim 13, wherein said crossbar has two flat surfaces and two ends, said ends being defined at said terminal edges of said two flat surfaces, and one of said ends of said crossbar is mounted directly against said lower surface of said plate, such that said two flat surfaces extend transverse to said length of said receiver tube and transverse to said lower surface of said plate.

15. The apparatus of claim 10, further comprising three sidewalls which are mounted to extend upwards from said plate, orthogonal to said upper surface of said plate.

16. The apparatus of claim 15, further comprising two tailgate sidewall extensions which are mounted to forward ends of respective ones of two of said three sidewalls, and extend forward of said plate and adjacent to opposite sides of said tailgate.

17. The apparatus of claim 16, wherein said two tailgate sidewall extension comprise respective ones of two flat plates, pivotally mounted to said forward ends of said two sidewalls and extending transverse to said upper surface of said plate.

18. The apparatus of claim 10, further comprising:
said length of said receiver tube extends parallel to forward and rearward directions;
said aluminum crossbar is defined by a flat strip of aluminum which is mounted to extend from one of said side edges to an other of said side edges of said plate and which abuts said rearward end of said receiver tube, said crossbar having a length, two flat surfaces and two ends, said ends being defined at terminal edges of said two flat surfaces, and one of said ends of said crossbar is mounted directly against said lower surface of said plate, such that said two flat surfaces extend transverse to said length of said receiver tube and transverse to said lower surface of said plate;
three sidewalls which are mounted to extend upwards from said plate, orthogonal to said upper surface of said plate; and
two tailgate sidewall extensions which are mounted to forward ends of respective ones of two of said three sidewalls, and extend forward of said plate and adjacent to opposite sides of said tailgate, said two tailgate sidewall extension comprise respective ones of two flat plates, pivotally mounted to said forward ends of said two sidewalls and extending transverse to the upper surface of said plate.

19. An apparatus for extending a cargo surface of a bed or a tailgate of a truck having a receiver hitch, comprising in combination:
a flat aluminum diamond plate having a planar upper surface, a planar lower surface, a rearward end, a forward end and two side edges;
a receiver tube formed of square aluminum tubing and mounted to said lower surface of said aluminum diamond plate along a length of said receiver tube, said length extending between said forward and rearward ends of aluminum diamond plate, parallel to forward and rearward directions relative to said aluminum diamond plate and the truck, and said receiver tube having a pair of holes which are spaced apart on opposite sides of said receiver tube and aligned transverse to said length for receiving a latch pin;

an aluminum support plate which is mounted to said lower side of said aluminum diamond plate, extending from one of said side edges to an other of said side edges of said aluminum diamond plate and which abuts a rearward end of said receiver tube, said aluminum support plate having a length, two flat surfaces and two ends, said ends being defined at said terminal edges of said two flat surfaces, and one of said ends of said aluminum support plate being mounted directly against said lower surface of said aluminum diamond plate, such that said two flat surfaces extend transverse to said length of said receiver tube and transverse to said lower surface of said aluminum diamond plate;

an elongated mounting post formed of square tubing, and having a forward end which releasably fits within said receiver hitch and a rearward end which releasably fits within said tubular body of said receiver tube, said mounting post having forward and rearward holes which extend transversely through said receiver tube, said forward hole being disposed for aligning with the receiver hitch for receiving a second latch pin and said rearward hole being disposed for aligning with said holes of said receiver tube for receiving said latch pin to secure said receiver post within said receiver tube;

wherein aluminum diamond plate and said elongated mounting post have respective lengths and profiles such that when said forward end of said elongated post is secured within said receiver hitch and said rearward end of said elongated post is secured within said receiver tube, a forward end of said lower side of said aluminum diamond plate will fit directly against and overlap the cargo surface of the truck;

three aluminum sidewalls which are mounted to extend upwards from aluminum diamond plate, orthogonal to said upper surface of aluminum diamond plate; and two tailgate sidewall extensions which are mounted to forward ends of respective ones of two of said three sidewalls, and extend forward of aluminum diamond plate and adjacent to opposite sides of said tailgate, said two tailgate sidewall extension comprise respective ones of two flat aluminum plates, pivotally mounted to said forward ends of said two sidewalls and extending transverse to the upper surface of aluminum diamond plate.

20. A method for extending an upwardly facing cargo surface of a bed or a tailgate of a truck having a receiver hitch, comprising the steps of:

providing a platform having a planar surface, three sidewalls and two tailgate sidewall extensions which extend transverse to the planar surface, a receiver tube rigidly mounted to the platform and beneath the planar surface, and a mounting post;

mounting the mounting post within the receiver hitch, such that the mounting post extends rearward of and upwards from the receiver hitch;

placing the receiver tube over a rearward end of the mounting post, with the platform extending above the mounting post and rearward of the truck bed, and the platform fitting flush against and overlapping the cargo surface of the truck;

fitting the two tailgate sidewall extensions adjacent to bed sidewalls of the truck; and latching the receiver tub to the mounting post.

* * * * *